United States Patent
Hayama

(10) Patent No.: US 8,775,690 B2
(45) Date of Patent: Jul. 8, 2014

(54) CONTROL APPARATUS, SWITCH, OPTICAL TRANSMISSION APPARATUS, AND CONTROL METHOD

(75) Inventor: Yutaka Hayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 13/165,442

(22) Filed: Jun. 21, 2011

(65) Prior Publication Data

US 2011/0320641 A1 Dec. 29, 2011

(30) Foreign Application Priority Data

Jun. 28, 2010 (JP) ................................ 2010-146435

(51) Int. Cl.
*G06F 3/00* (2006.01)

(52) U.S. Cl.
USPC .......................................................... 710/15

(58) Field of Classification Search
None
See application file for complete search history.

(56) References Cited

U.S. PATENT DOCUMENTS

| | | | | |
|---|---|---|---|---|
| 6,011,921 | A * | 1/2000 | Takahashi et al. ............... | 710/48 |
| 7,797,444 | B2 * | 9/2010 | Kabashima et al. ........... | 709/238 |

| | | | | |
|---|---|---|---|---|
| 2005/0114581 | A1 | 5/2005 | Azadet et al. | |
| 2006/0179144 | A1 * | 8/2006 | Nagase ........................... | 710/62 |
| 2012/0324078 | A1 * | 12/2012 | Sugimoto et al. ............. | 709/223 |

FOREIGN PATENT DOCUMENTS

JP 2005-158076 6/2005

* cited by examiner

*Primary Examiner* — Idriss N Alrobaye
*Assistant Examiner* — Dayton Lewis-Taylor
(74) *Attorney, Agent, or Firm* — Fujitsu Patent Center

(57) ABSTRACT

A control apparatus includes a first processor that is operative to perform outputting first data including control data, a first input/output interface that receives the first data, a second input/output interface that receives and outputs data, a third input/output interface that receives and outputs data using a second communication method, in which transmission speed is lower than transmission speed in the first communication method, and a second processor that is operable to perform controlling the second input/output interface outputs third data, which is obtained by replacing the control data included in the first data received by the first input/output interface with second data received by the third input/output interface, to a control target apparatus, controlling the control target apparatus outputs the third data received from the second input/output interface, and controlling the third input/output interface outputs response data in response to the third data received from the control target apparatus.

12 Claims, 17 Drawing Sheets

| READ REQUEST PACKET | STP | Reserved | TLP SEQUENCE NUMBER (0~4095) | | | |
|---|---|---|---|---|---|---|
| R | Fmt=00b | Type=000000[b] | R | TC | Reserved | TD | EP | Attr | Reserved | Length |
| REQUEST ID | | TAG=0x00 | Last DW BE | 1st DW BE |
| ADDRESS [31:2] | | | | R | R |
| LCRC | | | | | |
| END | | | | | R=Reserved |

1110

| WRITE REQUEST PACKET | STP | Reserved | TLP SEQUENCE NUMBER (0~4095) |
|---|---|---|---|
| R | Fmt=10b | Type=000000[b] | R | TC | Reserved | TD | EP | Attr | Reserved | Length |
| REQUEST ID | | TAG=0x00 | Last DW BE | 1st DW BE |
| ADDRESS [31:2] | | | | R | R |
| PAYLOAD DATA [31:0] | | | | | |
| LCRC | | | | | |
| END | | | | | R=Reserved |

1120

| CONTROL READ REQUEST PACKET | STP | Reserved | TLP SEQUENCE NUMBER (0~4095) |
|---|---|---|---|
| R | Fmt=00b | Type=000000[b] | R | TC | Reserved | TD | EP | Attr | Reserved | Length |
| REQUEST ID | | TAG=0x00 | Last DW BE | 1st DW BE |
| ADDRESS [31:2]=ADDRESS OF SCRATCH-PAD REGISTER | | | | R | R |
| LCRC | | | | | |
| END | | | | | R=Reserved |

1130

| CONTROL WRITE REQUEST PACKET | STP | Reserved | TLP SEQUENCE NUMBER (0~4095) |
|---|---|---|---|
| R | Fmt=10b | Type=000000[b] | R | TC | Reserved | TD | EP | Attr | Reserved | Length |
| REQUEST ID | | TAG=0x00 | Last DW BE | 1st DW BE |
| ADDRESS [31:2]=ADDRESS OF SCRATCH-PAD REGISTER | | | | R | R |
| PAYLOAD DATA [31:0] = ALL "0" | | | | | |
| LCRC | | | | | |
| END | | | | | R=Reserved |

FIG. 9

CONTROL APPARATUS, SWITCH, OPTICAL TRANSMISSION APPARATUS, AND CONTROL METHOD

CROSS-REFERENCE TO RELATED APPLICATIONS

This application is based upon and claims the benefit of priority of the prior Japanese Patent Application No. 2010-146435, filed on Jun. 28, 2010, the entire contents of which are incorporated herein by reference.

FIELD

The present disclosure relates to a control apparatus, a switch, an optical transmission apparatus, and a control method.

BACKGROUND

In recent years, high-speed interfaces as devices used for input and output of data between apparatuses have been realized. High-speed interfaces are utilized for communication between Large-Scale Integrated (LSI) chips on a board, communication between boards, communication between chassis using an optical cable, and the like.

As a standard that specifies the specifications of high-speed interfaces, for example, PCI Express is known. PCI Express is a standard regarding not parallel communication in which a large number of signal lines are used but serial communication in which a protocol based on packets is adopted.

A high-speed interface has a buffer that receives data which is transmitted at high speed, and a control circuit that performs order control and flow control. The buffer and the control circuit are provided as, for example, a programmable logic device (PLD), a Field-Programmable Gate Array (FPGA), or an application-specific integrated circuit (ASIC). An example of the related art is disclosed in Japanese Unexamined Patent Application Publication No. 2005-158076.

When one of apparatuses that perform input and output of data between each other has a high-speed interface, the other apparatus also needs to have a high-speed interface. Therefore, even in the case of communication between two points for which high-speed communication is not necessary, when one of apparatuses has a high-speed interface, the other apparatus needs to have a high-speed interface.

SUMMARY

According to an aspect of the disclosed embodiments, a control apparatus includes a first processor that is operative to perform outputting first data including control data using a first communication method, a first input/output interface that receives the first data using the first communication method, a second input/output interface that receives and outputs data using the first communication method, a third input/output interface that receives and outputs data using a second communication method, in which transmission speed is lower than transmission speed in the first communication method, and a second processor that is operable to perform controlling the second input/output interface in such a way that the second input/output interface outputs third data, which is obtained by replacing the control data included in the first data received by the first input/output interface with second data received by the third input/output interface, to a control target apparatus, controlling the control target apparatus in such a way that the control target apparatus outputs the third data received from the second input/output interface, and controlling the third input/output interface in such a way that the third input/output interface outputs response data in response to the third data received from the control target apparatus.

The object and advantages of the disclosed embodiments will be realized and attained by means of the elements and combinations particularly pointed out in the claims.

It is to be understood that both the foregoing general description and the following detailed description are exemplary and explanatory and are not restrictive of the disclosed embodiments, as claimed.

BRIEF DESCRIPTION OF THE DRAWINGS

FIG. 4 illustrates a diagram illustrating an example of formats of data output from the first processor.

FIG. 9 illustrates a diagram illustrating an example of formats of response data of a control target apparatus and data output from the control target apparatus to the first processor or the second processor.

DESCRIPTION OF EMBODIMENTS

Figure 1:
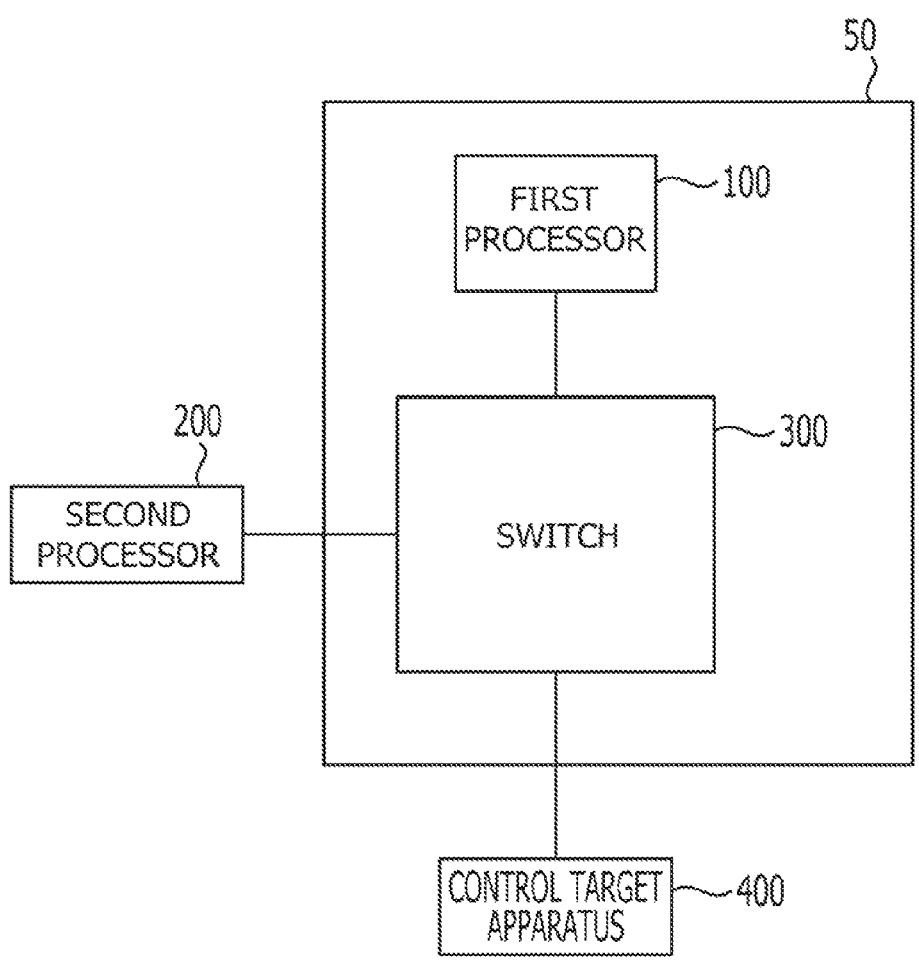
FIG. 1 illustrates a diagram illustrating an example of a control apparatus.

FIG. 1 illustrates a diagram illustrating an example of a control apparatus. A control apparatus 50 illustrated in FIG. 1 has a first processor 100 and a switch 300. The control apparatus 50 is connected to a second processor 200 and a control target apparatus 400.

The first processor 100 and the second processor 200 communicate with the control target apparatus 400 through the switch 300. The first processor 100, the switch 300, and the control target apparatus 400 receive or output data from or to one another in accordance with a standard that specifies a high-speed interface. The standard for a high-speed interface may be, for example, PCI Express. The switch 300 receives or outputs data from or to the second processor 200 using a communication method in which the transmission speed is lower than the transmission speed in a communication method specified by the high-speed interface. The low-speed communication method may be, for example, Inter-Integrated Circuit (I$^2$C).

The first processor 100 and the second processor 200 transmit control information to the control target apparatus 400 in order to control the operation of the control target apparatus 400 or monitor the state of the control target apparatus 400. The switch 300 is arranged between both the first processor 100 and the second processor 200 and the control target apparatus 400. The switch 300 operates as a switch for transferring input or output data from a source to a destination, thereby enabling communication between two points, that is, between the first processor 100 and the control target apparatus 400 and between the second processor 200 and the control target apparatus 400.

As described above, the switch 300 enables data input/output between the first processor 100 and the control target apparatus 400 using a high-speed interface and data input/output between the second processor 200 and the control target apparatus 400 using a low-speed interface, which is connected to the second processor 200. Therefore, the switch 300 can realize data input/output between two points in which, even if the control target apparatus 400, which is one of the two points to be used for the data input/out between two points, uses a high-speed interface, the second processor 200, which is the other of the two points, need not use a high-speed interface.

Figure 2:
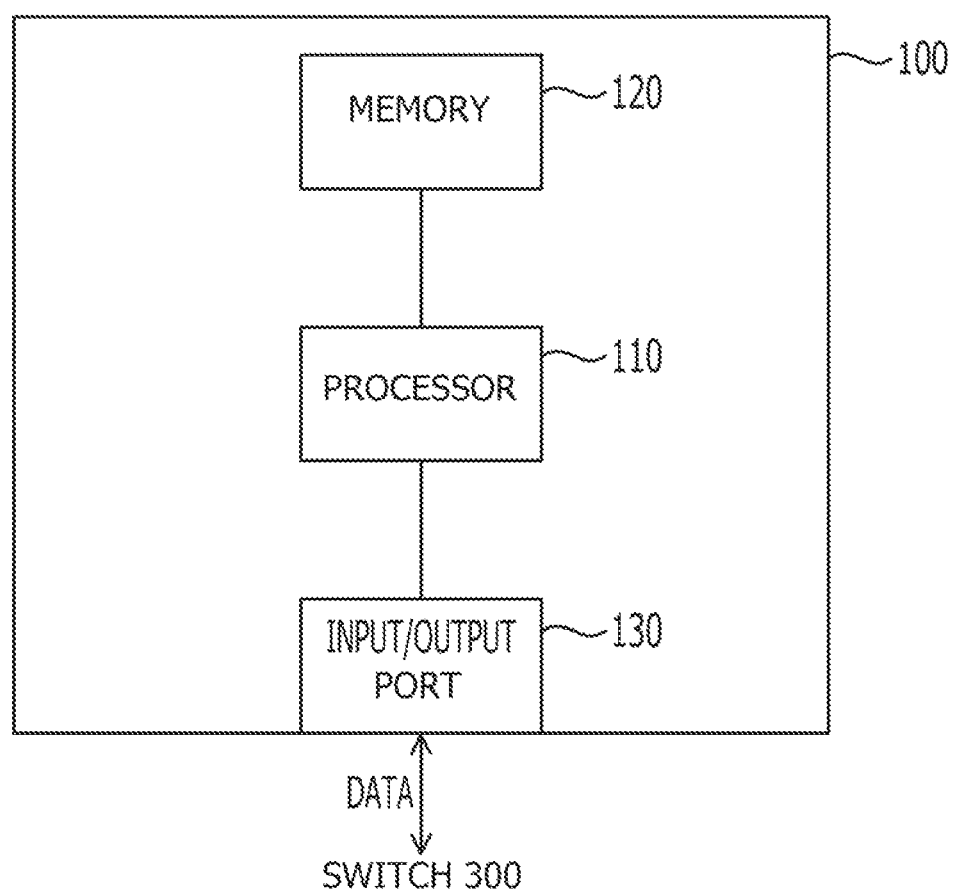
FIG. 2 illustrates a diagram illustrating an example of a first processor.

FIG. 2 is a diagram illustrating an example of a first processor. The first processor 100 has a processor 110, a memory 120, and an input/output port 130. The processor 110 performs an operation for executing commands included in a program. The commands include an arithmetic operation command, a logical operation command, and a command for accessing the memory 120. The processor 110 may be, for example, a central processor (CPU). The memory 120 is an apparatus that stores commands accessed by the processor 110. The memory 120 may be, for example, a dynamic random-access memory (DRAM) as a first memory, for which a storage operation is executed by the processor 110, or a magnetic disk apparatus or a solid-state drive (SSD) as a second memory. The memory 120 receives a program stored in a storage medium such as a digital versatile disc (DVD) or a compact disc (CD) through a drive apparatus, which is not illustrated in FIG. 2, of the first processor 100, as well as storing the program. The input/output port 130 receives or outputs data from or to the switch 300 in accordance with a standard for high-speed interfaces, such as PCI Express.

The first processor 100 transmits a read request packet (RRP) or a write request packet (WRP) in order to control or monitor the control target apparatus 400. The first processor 100 also outputs a control packet. The control packet is a packet for allowing the second processor 200, which does not have a high-speed interface, to communicate with an apparatus having a high-speed interface. The control packet may be a control read request packet (CRRP) or a control write request packet (CWRP). The switch 300 replaces the address of a control read request packet with an address transmitted from the second processor 200. The switch 300 replaces the address and the payload data of a control write request packet with an address and payload data transmitted from the second processor 200. Because the first processor 100 does not use a control packet to process the operation thereof, there is no problem in processing the operation of the first processor 100 when the control packet is replaced by an address or payload data transmitted from the second processor 200.

Figure 3:
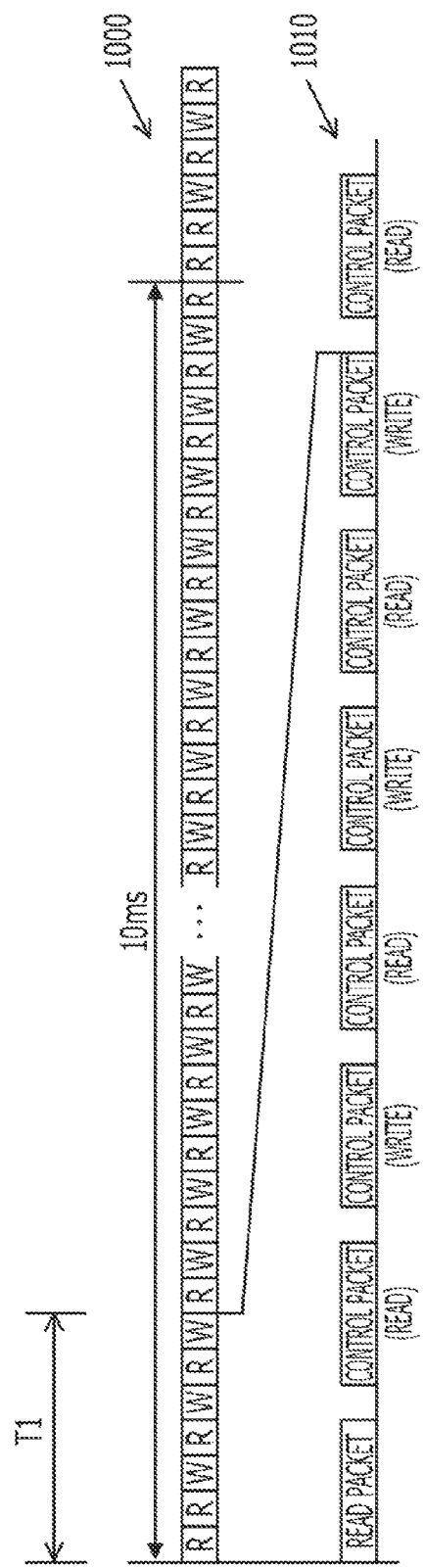
FIG. 3 illustrates a time chart illustrating an example of the timing at which the first processor transmits control packets.

FIG. 3 is a time chart illustrating an example of the timing at which the first processor 100 transmits control packets. A time chart 1000 is a time chart in which the first processor 100 outputs "read" (R) and "write" (W) to the control target apparatus 400. "R" illustrated in the time chart 1000 indicates a read packet or a read request packet, and "W" illustrated in the time chart 1000 indicates a write packet or a write request packet.

A time chart 1010 is a time chart obtained by magnifying a period T1 in the time chart 1000. In the period T1, a read packet, control write request packets, and control read request packets are output. The first processor 100 transmits control packets while the first processor 100 does not transmit a read packet or a write packet. Thus, since the first processor 100 transmits control packets while the first processor 100 does not transmit packets to be used thereby, the control packets can be transmitted without affecting the normal operation of the first processor 100.

FIG. 4 is a diagram illustrating an example of formats of data output by the first processor 100. The data formats illustrated in FIG. 4 comply with PCI Express. PCI Express defines data transmission in the form of packets.

A data format 1100 is the data format of read request packets. A data format 1110 is the data format of write request packets. A data format 1120 is the data format of control read request packets. A data format 1130 is the data format of control write request packets. In the example illustrated in FIG. 4, "R" and "Reserved" indicate unused fields.

The data formats 1100 and 1110 have the fields of starting framing characters, Transaction Layer Packet (TLP) sequence numbers, headers, data, Link Cyclic Redundancy Check (LCRC), and ending framing characters. PCI Express defines a layer structure. Each field mentioned above is a field to be used by any of the layers that are included in the layer structure, namely a physical layer, a data link layer, a transaction layer, and a software layer. Each field will be described hereinafter.

"STP" located at the top of each data format and "END" located at the end of each data format are fields for the physical layer. "STP" is a starting framing character and indicates the beginning of TLPs. "END" indicates the end of the packets.

"TLP Sequence Number" and "LCRC" are fields for the data link layer. The TLP sequence number is a number provided by a source and managed using a 12-bit counter. The initial value is "0" and increased by 1 as a TLP is transmitted. After reaching "4095", the TLP sequence number returns to "0". After providing a sequence number to a packet, the first processor 100 calculates the LCRC from the sequence number and the TLP itself. An apparatus that has received the packet calculates the LCRC in the same manner as the first processor 100 and judges whether or not there is data in the TLP itself by comparing the received value of the LCRC and the calculated value.

"Fmt" to "Address" are included in a packet header. "Fmt" indicates the format of a TLP. "00b" indicates that there is no data, and "10b" indicates that there is data. Since the data formats 1100 and 1120 are the data formats of read request packets, "Fmt" is "00b", and since the data formats 1110 and 1130 are the data formats of write request packets, "Fmt" is "10b". "Type" indicates the type of TLP. "Type=00000" illustrated in FIG. 4 indicates a memory read request or a memory write request. "TC" indicates a traffic class. "TC" is used to define a service quality.

"EP" indicates that there is a problem in the data of a TLP. "Attr" indicates the attribute of a TLP. "Length" indicates the length of the payload of data. "Request ID" includes 16 bits including a bus number, a device number, and a function number.

For "Tag", a value can be used. In the case of a read or write request packet output from the first processor 100, "Tag" is set to "0x00". According to PCI Express, a tag to be used for a response packet transmitted from a destination is the same as one used for a packet output from a source.

Address data uses a bit width of bit [31:2] (from bit 31 to bit 2). Payload data uses a bit width of bit [31:0] (from bit 31 to bit 0). As illustrated in the data formats 1100 and 1120, there is no field of payload data in a read request packet and a control read request packet. In addition, as illustrated in the data formats 1110 and 1130, there are fields of payload data in a write request packet and a control write request packet.

The data formats 1120 and 1130 of control packets are the same as the data formats 1100 and 1110 of the above-described normal output data except for portions described below.

The tags of a control write request packet and a control read request packet output from the first processor 100 are "0xFF". Therefore, when a tag is "0xFF", the switch 300 can judge that a received packet is a control packet. In addition, the addresses of a control write request packet and a control read request packet are not addresses for an input/output port of the control target apparatus 400, but arbitrary addresses. This is because the switch 300 converts the addresses into those of write packets or read packets output from the second processor 200. In the example illustrated in FIG. 4, an arbitrary address such as a scratch-pad register of the processor 110 is input as the address. The first processor 100 sets the payload data of all the control write request packets to "0".

Thus, the first processor 100 generates a control packet that includes a tag with which the switch 300 can recognize the control packet as such, and outputs the control packet to the switch 300.

Figure 5:
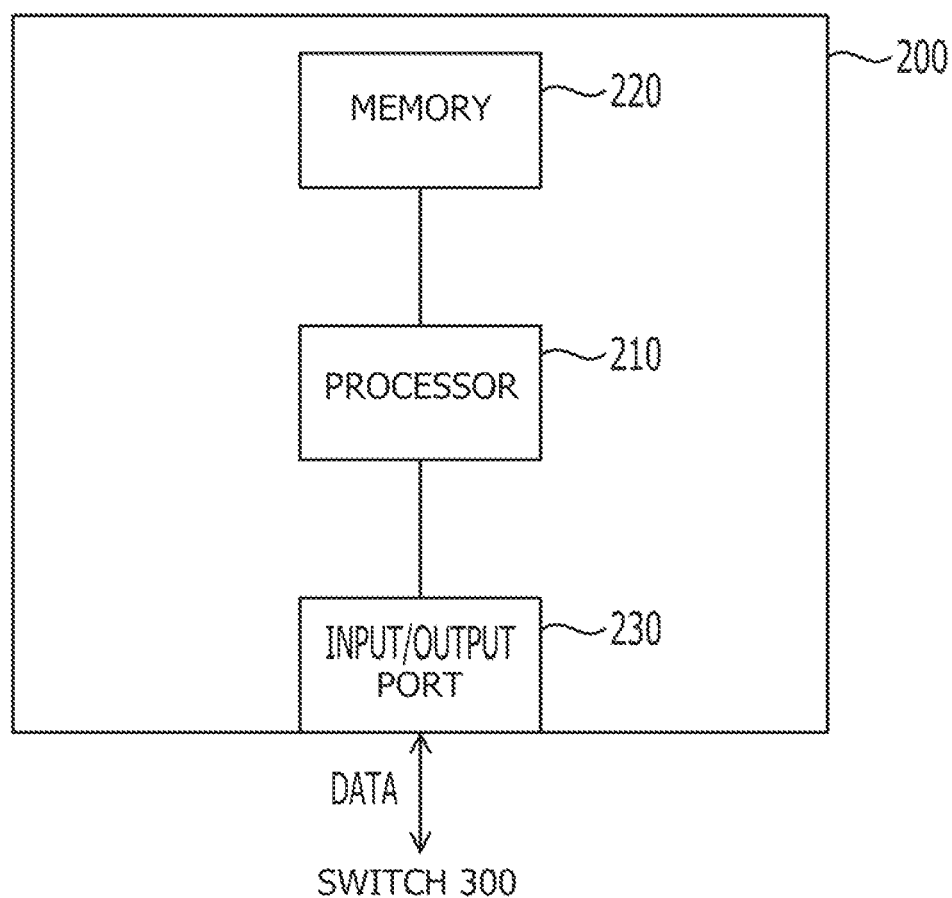
FIG. 5 illustrates a diagram illustrating an example of a second processor.

FIG. 5 is a diagram illustrating an example of a second processor. The second processor 200 has a processor 210, a memory 220, and an input/output port 230. The processor 210 performs an operation for executing commands included in a program. The commands include an arithmetic operation command, a logical operation command, and a command for accessing the memory 220. The processor 210 may be, for example, a CPU. The memory 220 is an apparatus that stores commands accessed by the processor 210. The memory 220 may be, for example, a DRAM as a first memory, for which a storage operation is executed by the processor 210, or a magnetic disk apparatus or an SSD as a second memory. The input/output port 230 receives or outputs data from or to the switch 300 using a communication method in which the transmission speed is lower than the transmission speed adopted by the input/output port 130 of the first processor 100. The low-speed communication method may be, for example, I²C.

Figure 6:
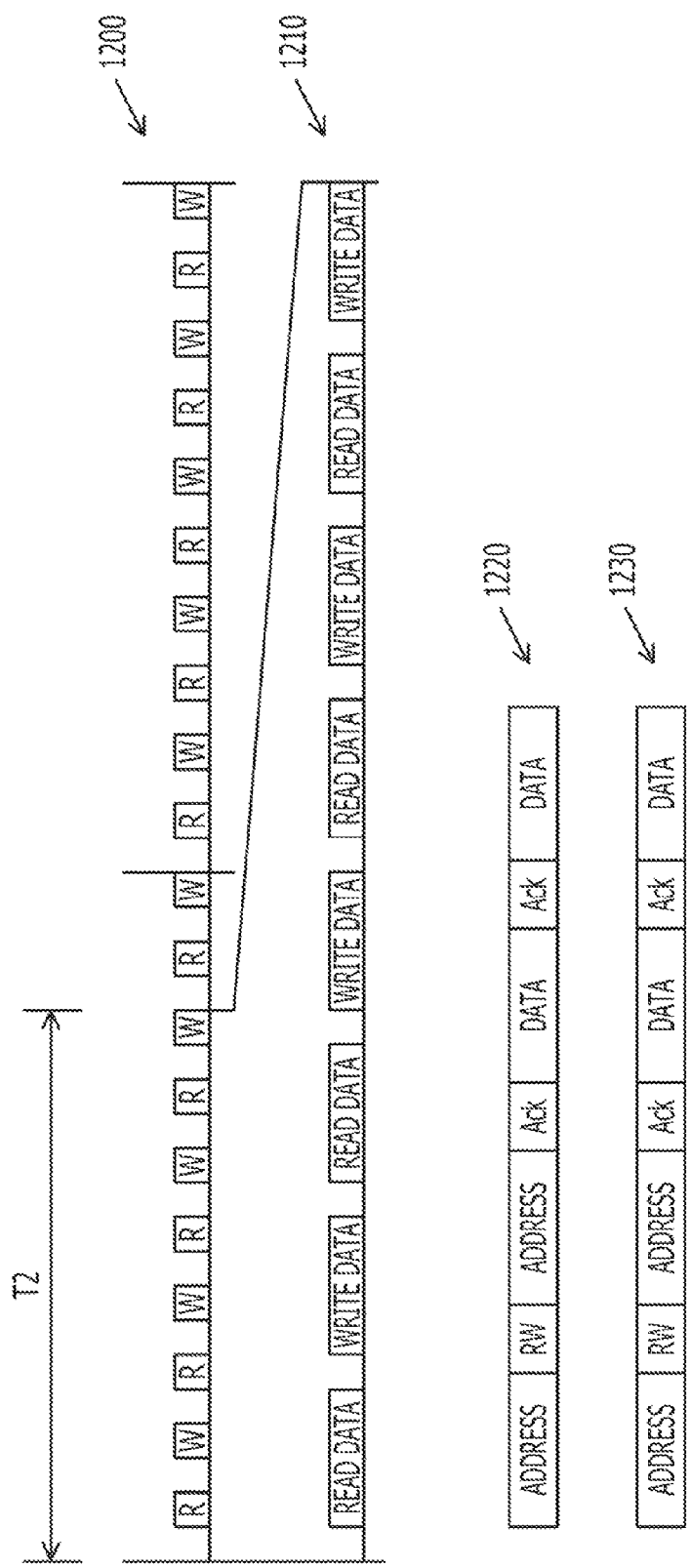
FIG. 6 illustrates a diagram illustrating an example of the timing at which the second processor transmits data and an example of the data output from the second processor.

The second processor 200 transmits read data or write data in order to control or monitor the control target apparatus 400. FIG. 6 is a diagram illustrating an example of the timing at which the second processor 200 transmits data and an example of data output from the second processor 200. The examples illustrated in FIG. 6 are examples of data output in accordance with I²C. A time chart 1200 is a time chart in which the second processor 200 outputs "read" (R) and "write" (W) to the control target apparatus 400. "R" illustrated in the time chart 1200 indicates read data, and "W" illustrated in the time chart 1200 indicates write data.

A time chart 1210 is a time chart obtained by magnifying a period T2 in the time chart 1200. In the period T2, read data and write data are output.

A data format 1220 is the data format of read data. The data format 1220 includes an address field, an RW field that indicates whether the data is "read" or "write", and data output from the switch 300, which is a destination. The reason why the data of a destination appears in the data format 1220 is because I²C is a half-duplex communication method. When the RW field is "1", the data is read data. Since I²C is a half-duplex communication method, "Ack" (acknowledge) of the destination (slave) appears in the data format 1220. When the address has been transmitted and the destination has output "Ack", the destination outputs data whose address has been specified to the second processor 200.

A data format 1230 is the data format of write data. The data format 1230 includes an address field, an RW field that indicates whether the data is "read" or "write", and an Ack field. When the RW field is "0", the data is write data. When the RW field is "1", the data is read data. In the case of outputting write data, the second processor 200 outputs the data in appropriate bytes. After receiving "Ack", the second processor 200 outputs the data again.

Figure 7:
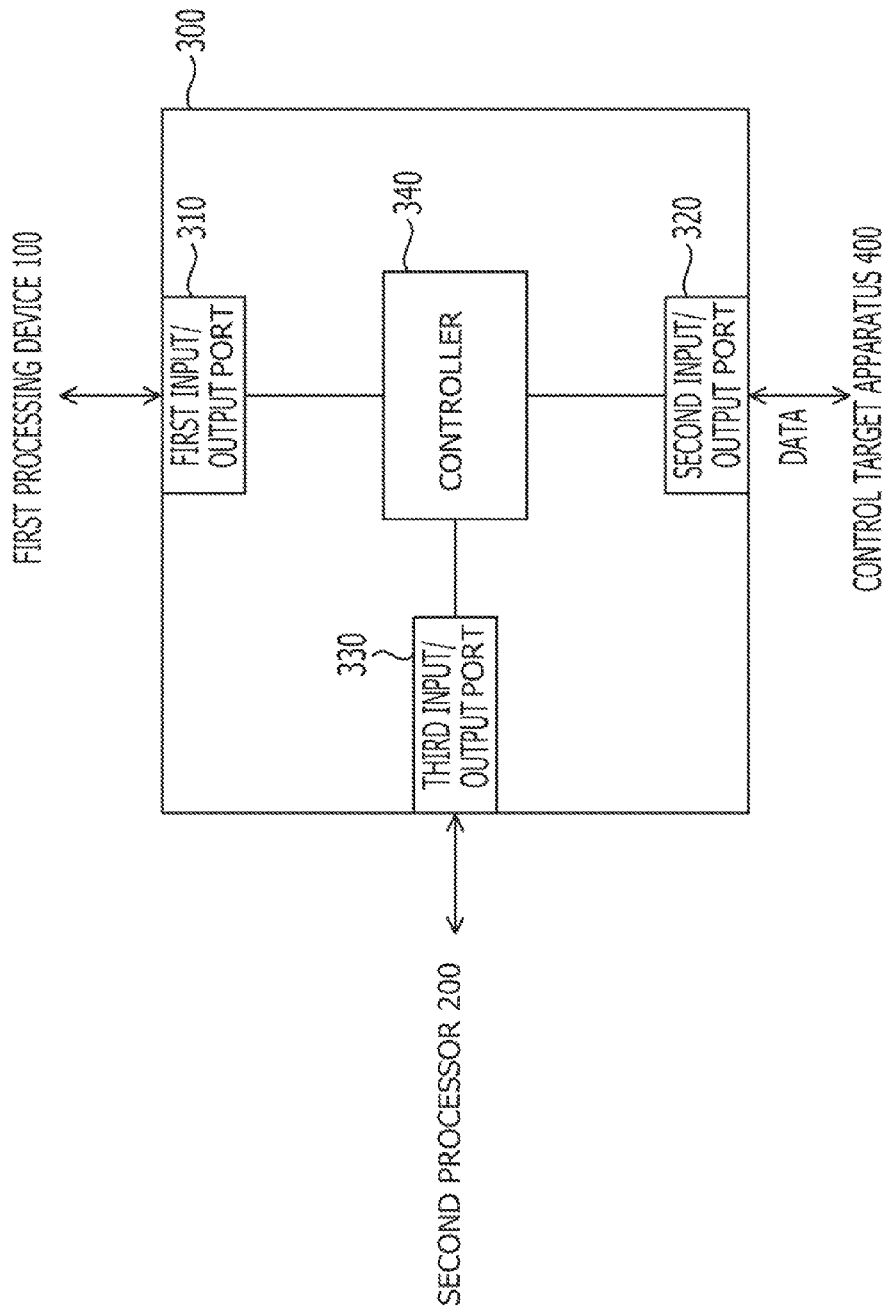
FIG. 7 illustrates a diagram illustrating an example of a switch.

FIG. 7 is a diagram illustrating an example of the switch 300. The switch 300 has a first input/output port 310, a second input/output port 320, a third input/output port 330, and a controller 340. The first input/output port 310 and the second input/output port 320 are high-speed interfaces. The first input/output port 310 receives or outputs data from or to the first processor 100. The second input/output port 320 receives or outputs data from or to the control target apparatus 400. The high-speed interfaces may be, for example, apparatuses that comply with the specifications of PCI Express.

The third input/output port 330 receives or outputs data from or to the second processor 200 using a transmission method in which the transmission speed is lower than the transmission speed adopted by the first input/output port 310 and the second input/output port 320. The low-speed transmission method may be, for example, I²C. The switch 300 may be, for example, a PLD, an FPGA, or an ASIC. The switch 300 may be, for example, a PLD or an FPGA reconfigured in such a way that the PLD or the FPGA achieves the functions required as the switch 300.

The controller 340 judges whether data received from the first processor 100 is a control packet or a normal read or write packet. The controller 340 judges whether the received data is a control packet or not on the basis of, for example, whether the value of a tag is "0xFF" or not.

If data transmitted from the first processor 100 is not a control packet, the controller 340 performs control in which the received data is output to the control target apparatus 400 from the second input/output port 320. If data transmitted from the first processor 100 is a control packet, the controller 340 executes a replacement process in which control data included in the payload of the control packet is replaced by data transmitted from the second processor 200, and outputs the data that has been subjected to the replacement process to the control target apparatus 400.

Figure 8:
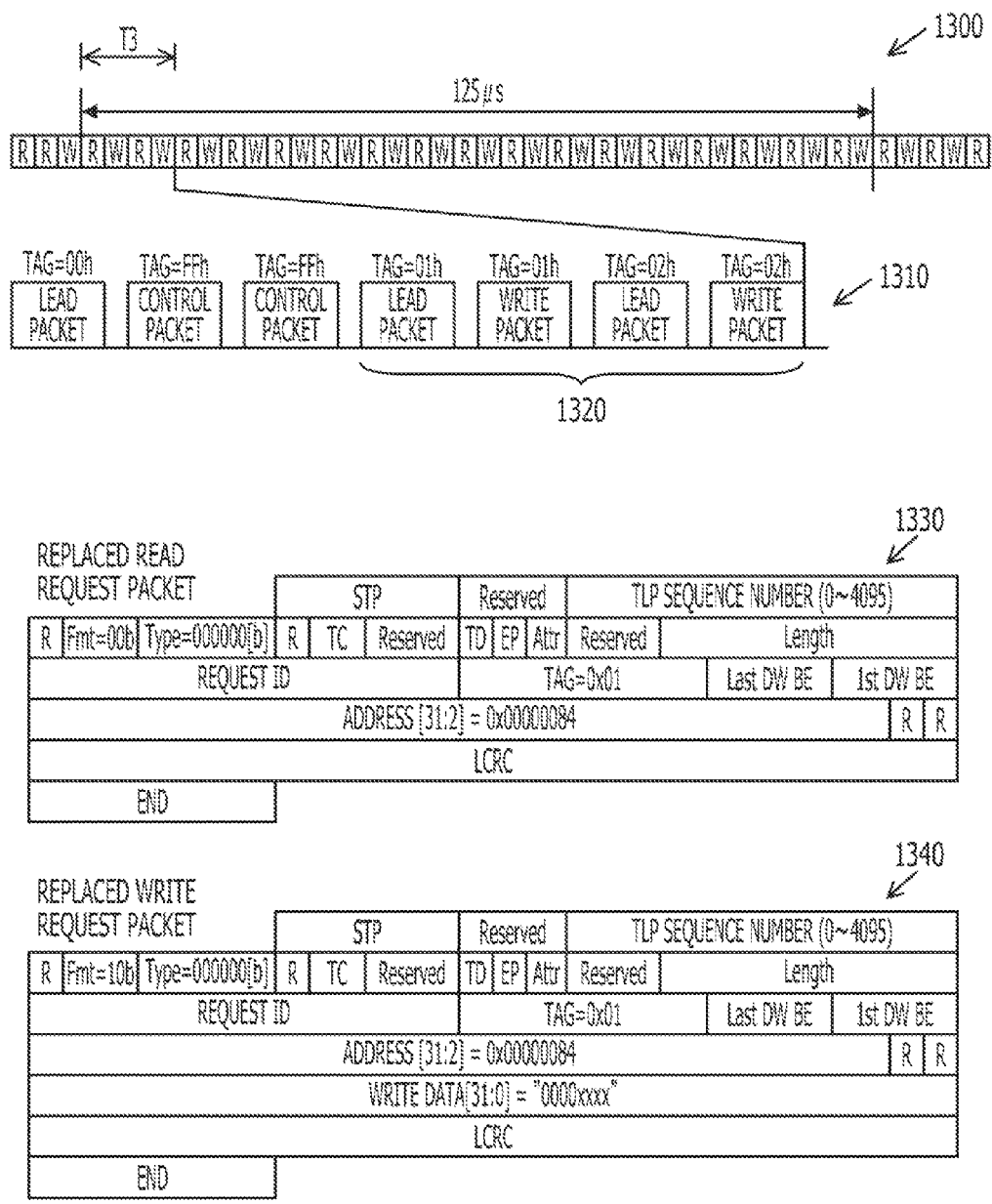
FIG. 8 illustrates a diagram illustrating some of control packets output from the first processor and an example of data that has been subjected to replacement for which data output from the second processor is used.

FIG. 8 is a diagram illustrating some of control packets output from the first processor 100 and an example of data that has been subjected to replacement for which data output from the second processor 200 is used. A time chart 1300 is a time chart of packets in which the first processor 100 outputs read request packets, write request packets, and control packets to the control target apparatus 400. A time chart 1310 is a time chart obtained by magnifying a period T3 in the time chart 1300. Some 1320 of the control packets output from the first processor 100 have been subjected to replacement for which data output from the second processor 200 is used.

A data format 1330 is an example of the data format of replaced read request packets RRRP, which are obtained by replacing some of control read request packets with read data output from the second processor 200. A data format 1340 is an example of the data format of replaced write request packets RWRP, which are obtained by replacing some of control write request packets with write data output from the second processor 200.

The switch 300 changes the tags of the replaced read request packets RRRP and the replaced write request packets RWRP from "0xFF" to "0x01" through the replacement process.

As described above, if the tag of a packet is "0x00", the packet is a write or read request packet. If the tag of a packet is "0xFF", the packet is a control packet, and if the tag of a packet is "0x01", the packet is a replaced write or read request packet. According to PCI Express, a response packet output from a destination has the same tag as a source. Therefore, the switch 300 can judge whether a response packet is a response to a write or read request packet, a control packet, or a replaced write or read request packet by recognizing the tag of the response packet.

In addition, the switch 300 changes, through the replacement process, the address of a read or write request packet from a scratch-pad address to the address of read or write data output from the second processor 200. Furthermore, the switch 300 changes the payloads of all the write request packets from "0" to the data of write data through the replacement process.

As described above, the switch 300 changes the read data or the write data output from the second processor 200 to a replaced read request packet RRRP or a replaced write request packet RWRP, respectively, using a control packet. The switch 300 then outputs the replaced read request packet RRRP or the replaced write request packet RWRP to the control target apparatus 400.

Figure 9:
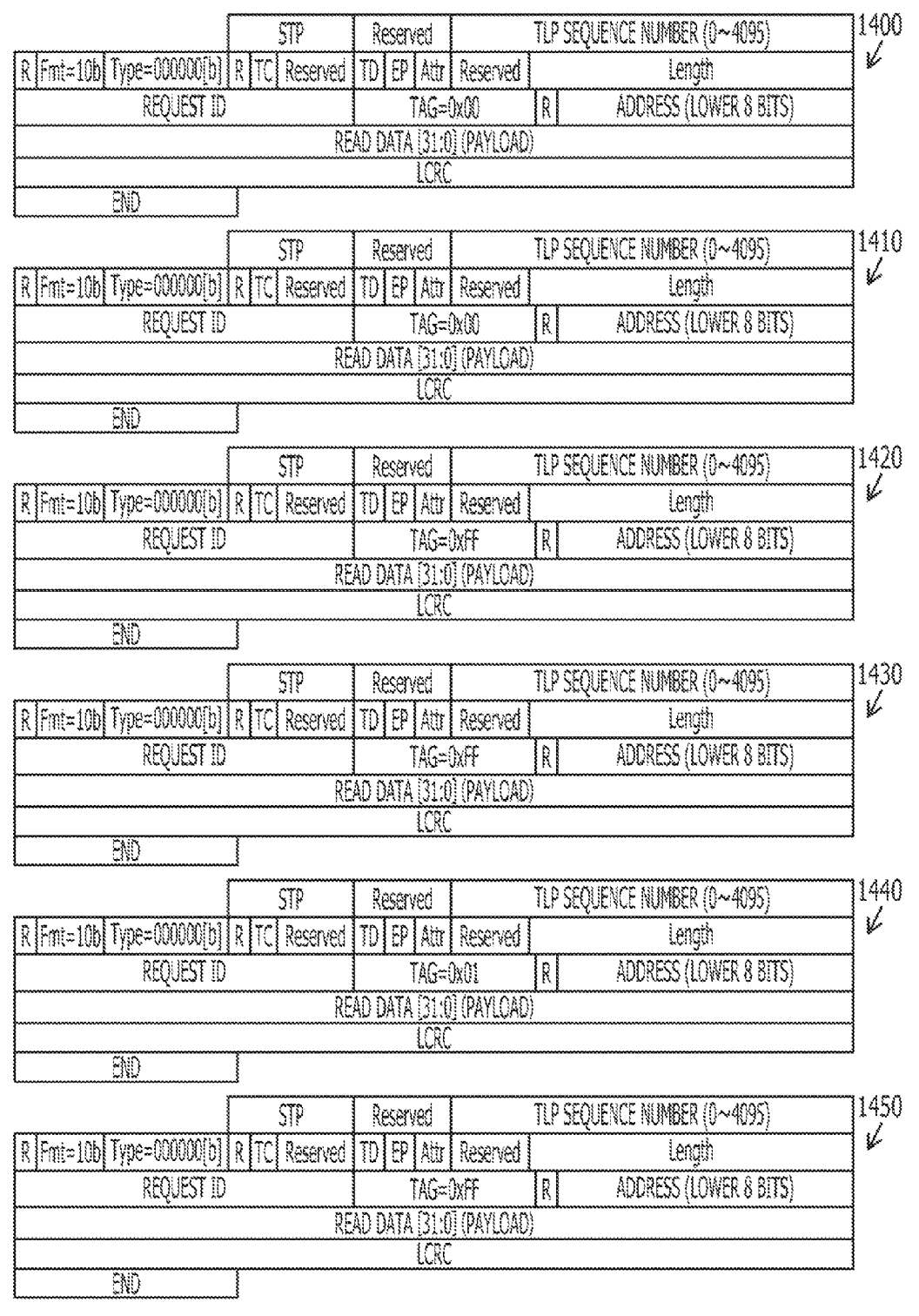

FIG. 9 is a diagram illustrating an example of the formats of response data of the control target apparatus 400 and data output from the control target apparatus 400 to the first processor 100 or the second processor 200. A response packet 1400 is output from the control target apparatus 400 to the switch 300 in response to a read request packet RRP. Since the response packet 1400 is a response to a read request, the response packet 1400 includes a payload, and the "Fmt" field thereof is "10b", which indicates that a payload is included. The "Tag" field of the response packet 1400 is the same as that of the read request packet RRP, namely "0x00".

A response packet 1410 is output from the switch 300 to the first processor 100 as a response packet output in response to a read request packet RRP. The response packet 1410 has the same data format as the response packet 1400. Since the tag of the response packet 1400 is not the tag "0x01" of a replaced packet, the switch 300 does not correct the response packet 1400 and outputs the response packet 1400 to the first processor 100 as the response packet 1410.

A response packet 1420 is output from the control target apparatus 400 to the switch 300 in response to a control read request packet CRRP. Since the response packet 1420 is a response to a read request, the response packet 1420 includes a payload, and the "Fmt" field thereof is "10b", which indicates that a payload is included. The "Tag" field of the response packet 1420 is the same as that of the control read request packet CRRP, namely "0xFF".

A response packet 1430 is output from the switch 300 to the first processor 100 as a response packet output in response to a control read request packet CRRP. The response packet 1430 has the same data format as the response packet 1420. Since the tag of the response packet 1420 is not the tag "0x01" of a replaced packet, the switch 300 does not correct the response packet 1420 and outputs the response packet 1420 to the first processor 100 as the response packet 1430.

A response packet 1440 is output from the control target apparatus 400 to the switch 300 in response to a replaced read request packet RRRP. Since the response packet 1440 is a response to a replaced read request, the response packet 1440 includes a payload, and the "Fmt" field thereof is "10b", which indicates that a payload is included. The "Tag" field of the response packet 1440 is the same as that of the replaced read request packet RRRP, namely "0x01".

A response packet 1450 is output from the switch 300 to the first processor 100 as a response packet output in response to a replaced read request packet RRRP. The response packet 1450 has the same data format as the response packet 1440 except for the "Tag" field. Since the tag of the response packet 1440 is the tag "0x01" of the replaced read request packet RRRP, the switch 300 changes the tag of the response packet 1440 from "0x01" to "0xFF" and outputs the packet whose tag has been changed to the first processor 100 as the response packet 1450. The reason why the tag is changed from "0x01" to "0xFF" is because the replaced read request packet RRRP is a packet generated from a control read request packet CRRP output from the first processor 100. In other words, this is because the first processor 100 would judge that there was an abnormality in response data if the response to a control read request packet CRRP, which has the tag "0xFF", were a packet having a different tag. So as not to cause such an abnormality, the switch 300 changes the tag of the response packet 1440 from "0x01" to "0xFF".

In addition, upon receiving the response packet 1440, the switch 300 outputs the payload of the response packet 1440 to the second processor 200 as the data of read data.

Thus, by outputting data output from the second processor 200 to the control target apparatus 400 using a control packet transmitted from the first processor 100, the switch 300 enables data input/output between the second processor 200, which does not have an input/output port that is a high-speed interface, and the control target apparatus 400.

In addition, the first processor 100 transmits control packets in idle time, in which a write or read request packet is not transmitted. Since a high-speed interface is used for data input/output between the first processor 100 and the switch 300, the idle time is long. Thus, since control packets are transmitted while utilizing the idle time, the normal input/output of the first processor 100 is not interfered and data input/output between the second processor 200 and the control target apparatus 400 using a low-speed interface is not interrupted.

In addition, the first processor 100 can confirm the normal operation of the switch 300 and/or the control target apparatus 400 by checking a response to a request packet. That is, it is possible for the first processor 100 to judge that there is a failure in the control target apparatus 400 when the first processor 100 does not receive data in response to a request packet.

Furthermore, it is possible for the first processor 100 to judge that the switch 300 has output read data of the second processor 200 using control data when a scratch-pad address and/or the data of payloads that are all "0" are not included in response data output in response to read request data. Therefore, the first processor 100 can confirm the normal operation of the second processor 200 on the basis of response data output in response to read data.

Figure 10:
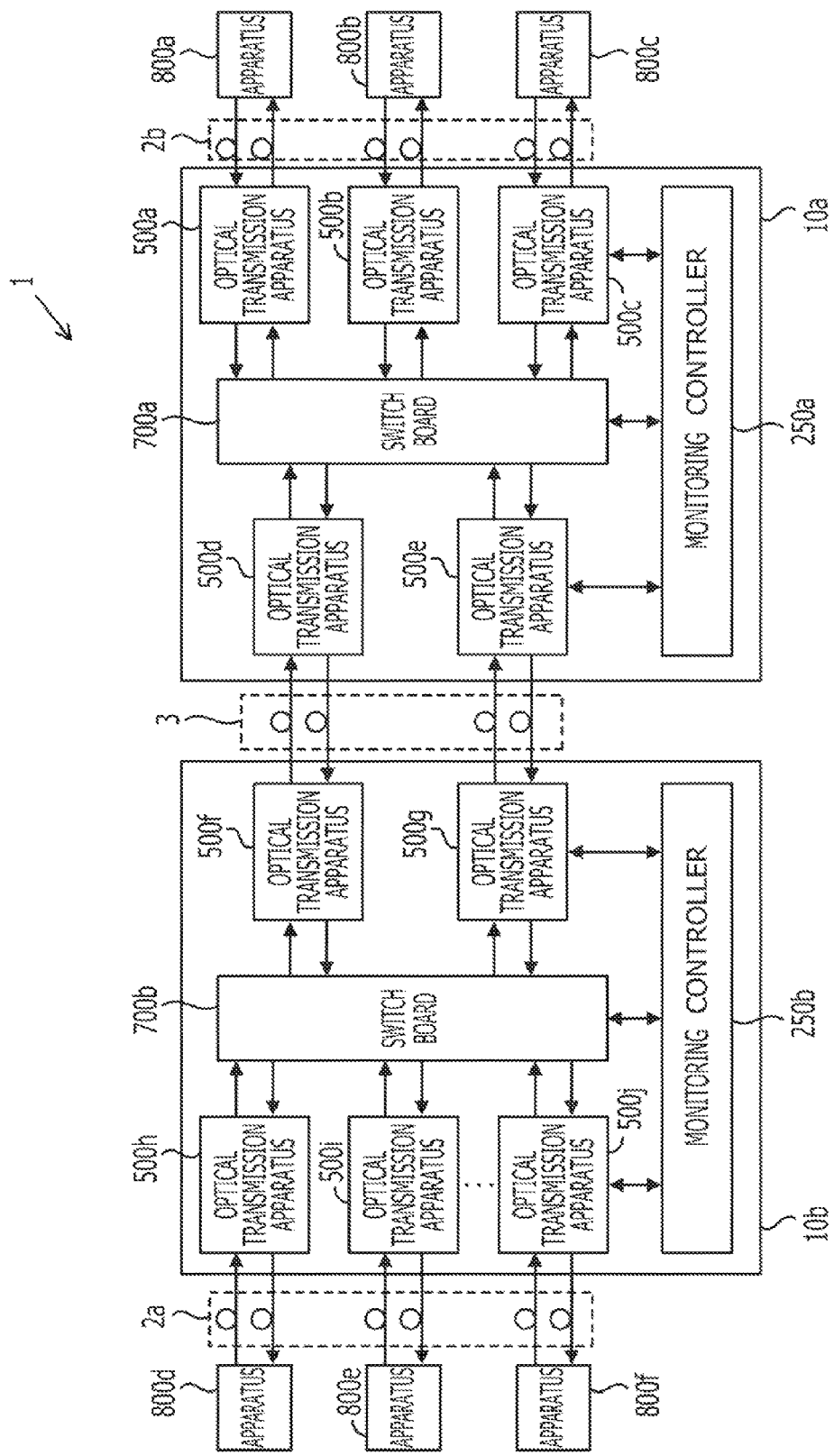
FIG. 10 illustrates an example of an optical communication network in which optical transmission apparatuses are used.

FIG. 10 illustrates an example of an optical communication network in which optical transmission apparatuses are used. In an optical communication network 1, transmission systems 10a and 10b are connected to each other through optical lines 3. The transmission system 10a is connected to apparatuses 800a to 800c through optical lines 2a, and the transmission system 10b is connected to apparatuses 800d to 800f through optical lines 2b.

The transmission system 10a has optical transmission apparatuses 500a to 500e, a switch board 700a, and a monitoring controller 250a. The transmission system 10b has optical transmission apparatuses 500f to 500j, a switch board 700b, and a monitoring controller 250b. An example of an optical transmission system will be described later with reference to FIGS. 11 and 16. The transmission systems 10a and 10b divide transmitted signals that have been multiplexed for each channel and perform a termination process. The transmission systems 10a and 10b then multiplex the signals that have been subjected to the termination process again and transmit the signals to each other. The apparatuses 800a to 800c perform optical communication with the apparatuses 800d to 800f through the transmission systems 10a and 10b and the optical lines 2a, 2b, and 3. The switch boards 700a and 700b execute a process for switching transmission paths between a plurality of optical transmission apparatuses connected thereto.

In the optical lines 2a, 2b, and 3, audio or image data or the like is allocated to each channel, and data of a plurality of channels is multiplexed and transmitted. Upon receiving the multiplexed data through the optical lines 2a or the optical lines 2b, the transmission system 10a or 10b divides data for each channel and performs the termination process. The transmission system 10a or 10b then multiplexes data of each channel again and transmits the data to the other transmission system 10b or 10a through the optical lines 3. The transmission speed of the optical lines 2a and 2b may be different from that of the optical lines 3. For example, the transmission speed of the optical lines 2a and 2b is 2.4 GHz, and the transmission speed of the optical lines 3 is 10 GHz. The reason why the transmission speed is different is, for example, because the amount of data transmitted between the transmission system 10a and the transmission system 10b is large and the number of lines of the optical lines 3 is small.

Figure 11:
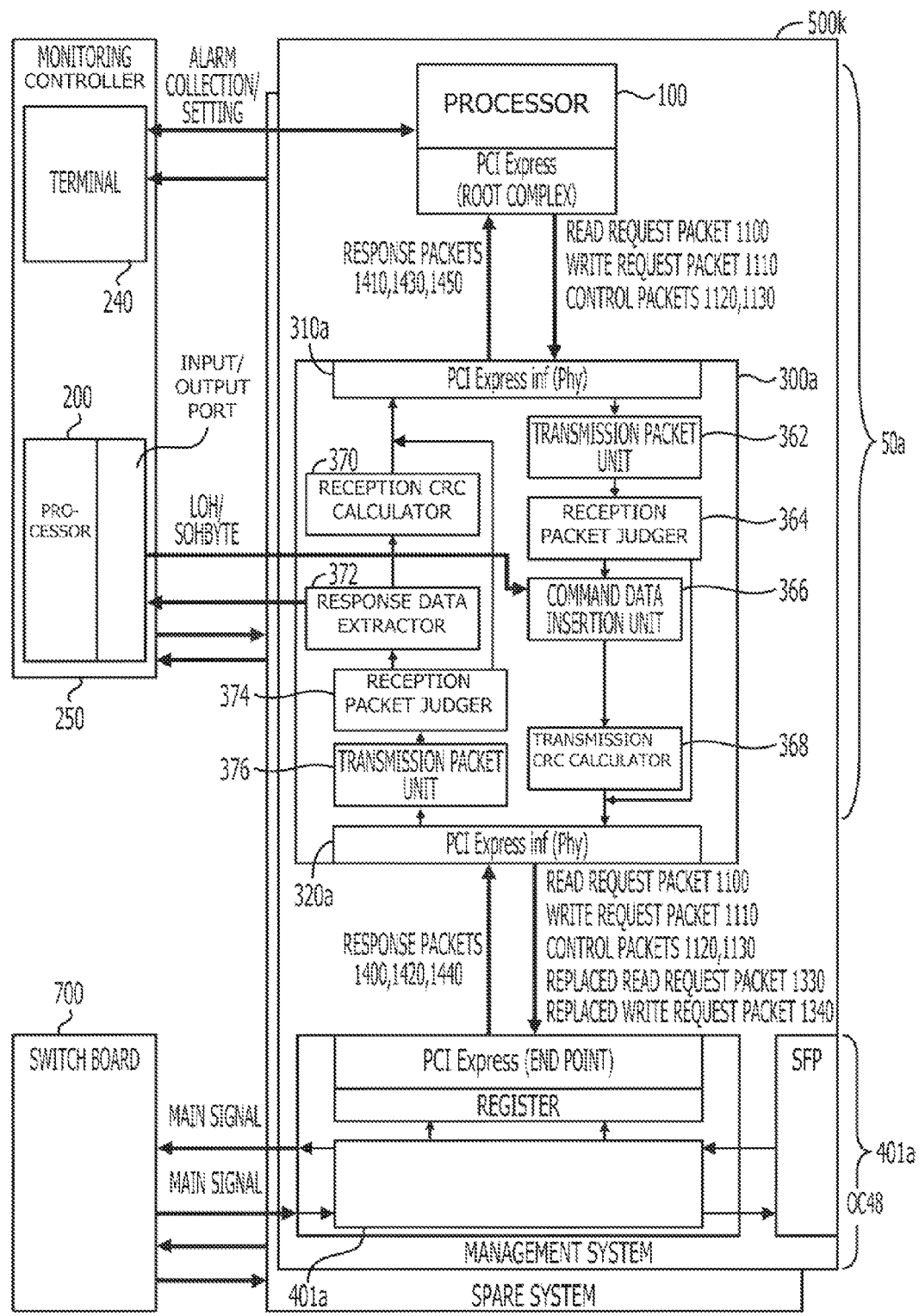
FIG. 11 illustrates a diagram illustrating a first example of an optical transmission apparatus.

FIG. 11 is a diagram illustrating a first example of an optical transmission apparatus. An optical transmission apparatus 500k, a termination apparatus 401a, and a switch board 700 are illustrated. The second processor 200 and a terminal 240 are incorporated into a monitoring controller 250. The optical transmission apparatus 500k corresponds to the optical transmission apparatuses 500a to 500c and 500h to 500j. The termination apparatus 401a corresponds to the control target apparatus 400 of the first processor 100 and the second processor 200. In addition, the second processor 200 outputs, through a switch 300a and the termination apparatus 401a, control information for switching transmission paths between a plurality of optical transmission apparatuses connected to the switch board 700. Therefore, the switch board 700 is the control target apparatus 400 of the second processor 200.

The optical transmission apparatus 500k has a control apparatus 50a that includes the first processor 100 and the switch 300a, and the termination apparatus 401a. The termination apparatus 401a divides transmitted signals that have been multiplexed for each channel and performs the termination process, as well as outputting the signals that have been subjected to the termination process to the switch board 700. The optical transmission apparatus 500k performs the termination process with the termination apparatus 401a and, in accordance with the first processor 100 or a request received from the second processor 200 in the monitoring controller 250, performs processes for controlling and monitoring the termination apparatus 401a.

The details of the termination apparatus 401a will be described later with reference to FIG. 14. The details of the monitoring controller 250 will be described later with reference to FIG. 15.

The switch 300a has a plurality of logical blocks that perform data processing in the physical layer of PCI Express. The plurality of logical blocks include a transmission packet unit 362, a transmission packet judger 364, a command data insertion unit 366, a transmission Cyclic Redundancy Check (CRC) calculator 368, a reception CRC calculator 370, a response data extractor 372, a reception packet judger 374, and a transmission packet unit 376.

PCI Express interfaces 310a and 320a extract a clock from a transmitted packet and perform descrambling, 10B-8B conversion, and S-P conversion. In addition, the PCI Express interfaces 310a and 320a perform 8B-10B conversion, P-S conversion, and scrambling on a packet to be transmitted.

The PCI Express interface 310a receives an RRP, a WRP, a CRRP, or a CWRP from the first processor 100 as a transmitted packet. The PCI Express interface 310a then outputs the transmitted packet to the transmission packet unit 362.

The transmission packet unit 362 temporarily stores a packet to be transmitted. The transmission packet judger 364 judges whether the transmitted packet read from the transmission packet unit 362 is a request packet, "Ack", or a control packet. If the received packet is a control packet, the transmission packet judger 364 outputs the control packet to the command data insertion unit 366. If the received packet is not a control packet, the transmission packet judger 364 outputs the request packet to the PCI Express interface 320a. The command data insertion unit 366 inserts a command output from the second processor 200 into the control packet that has been subjected to the judgment made by the transmission packet judger 364. Because the CRC after the command data is inserted is different from that of a control packet, the transmission CRC calculator 368 performs a CRC calculation on the packet to be transmitted and adds the results of the calculation to the packet to be transmitted. The transmission CRC calculator 368 then outputs, to the PCI Express interface 320a, the packet to be transmitted.

The PCI Express interface 320a outputs an RRP, a WRP, a CRRP, or a CWRP to the termination apparatus 401a as a packet to be transmitted. In addition, the PCI Express interface 320a outputs a replaced read request packet RRRP or a replaced write request packet RWRP to the termination apparatus 401a.

Furthermore, the PCI Express interface 320a receives the response packet 1400, 1420, or 1440 from the termination apparatus 401a.

The transmission packet unit 376 temporarily stores the transmitted packet as the response packet 1400, 1420, or 1440. The reception CRC calculator 370 performs a CRC calculation on a packet to be transmitted and adds the results of the calculation to the packet to be transmitted. The reception packet judger 374 judges whether the packet to be transmitted is a response packet output in response to a command packet of the first processor 100 or a response packet output in response to a replaced request packet. If the received packet is a response packet to a replaced request packet, the reception packet judger 374 outputs the response packet output in response to a replaced request packet to the response data extractor 372. If the received packet is not a response packet output in response to a replaced request packet, the reception packet judger 374 outputs the response packet to the PCI Express interface 310a.

The response data extractor 372 extracts response data from a response packet output in response to a command packet of the second processor 200 transmitted from the reception packet judger 374. Because the CRC after the response data is extracted is different from that before the response data is extracted, the reception CRC calculator 370 performs a CRC calculation on the packet to be transmitted and adds the results of the calculation to the packet to be transmitted. The reception CRC calculator 370 then outputs, to the PCI Express interface 310a, the packet to be transmitted.

The PCI Express interface 310a outputs the response packet 1400, 1420, or 1440 to the first processor 100.

Figure 12:
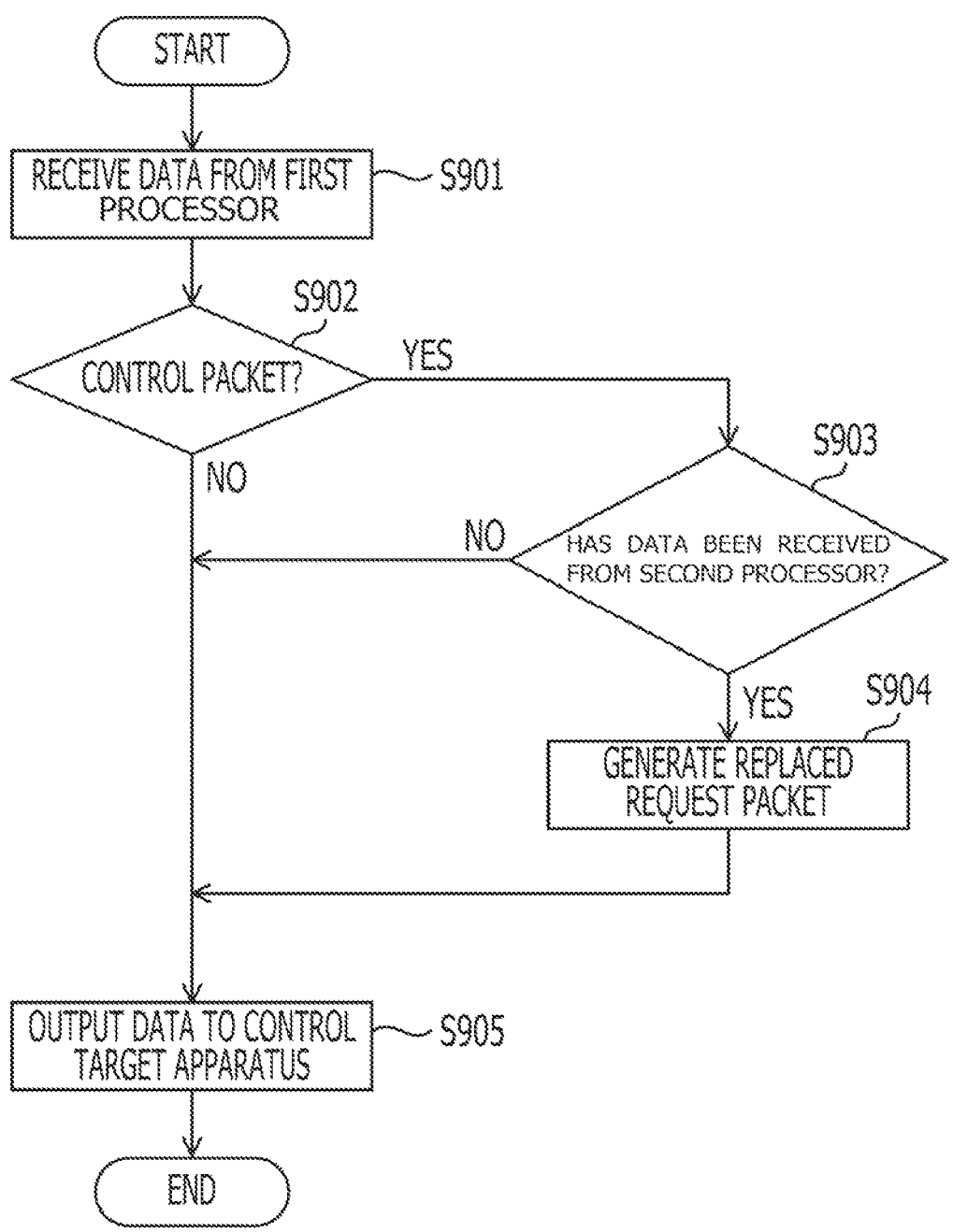
FIG. 12 illustrates a flowchart illustrating an example of a process for outputting data from the switch to the control target apparatus.

FIG. 12 is a flowchart illustrating an example of a process for outputting data from the switch 300 to the control target apparatus 400. First, the switch 300 receives data from the first processor 100 (S901). The data may be a read request packet, a write request packet, a control read request packet, or a control write request packet. The switch 300 then judges whether or not the received data is a control read request packet or a control write request packet (S902). If the received data is a control read request packet or a control write request packet (Y in S902), the switch 300 then judges whether or not the switch 300 has received data from the second processor 200 (S903). If the switch 300 has received data from the second processor 200 (Y in S903), the switch 300 replaces the address or the payload of a read request packet or a write request packet with the received data in order to generate a replaced request packet (S904). The switch 300 then outputs the replaced request packet to the control target apparatus 400 (S905).

If the received data is not a control read request packet or a control write request packet (N in S902), the switch 300 outputs the received data to the control target apparatus 400 (S905). In addition, if the switch 300 has not received data from the second processor 200, the switch 300 outputs a control read request packet or a control write request packet to the control target apparatus 400 (S905).

Figure 13:
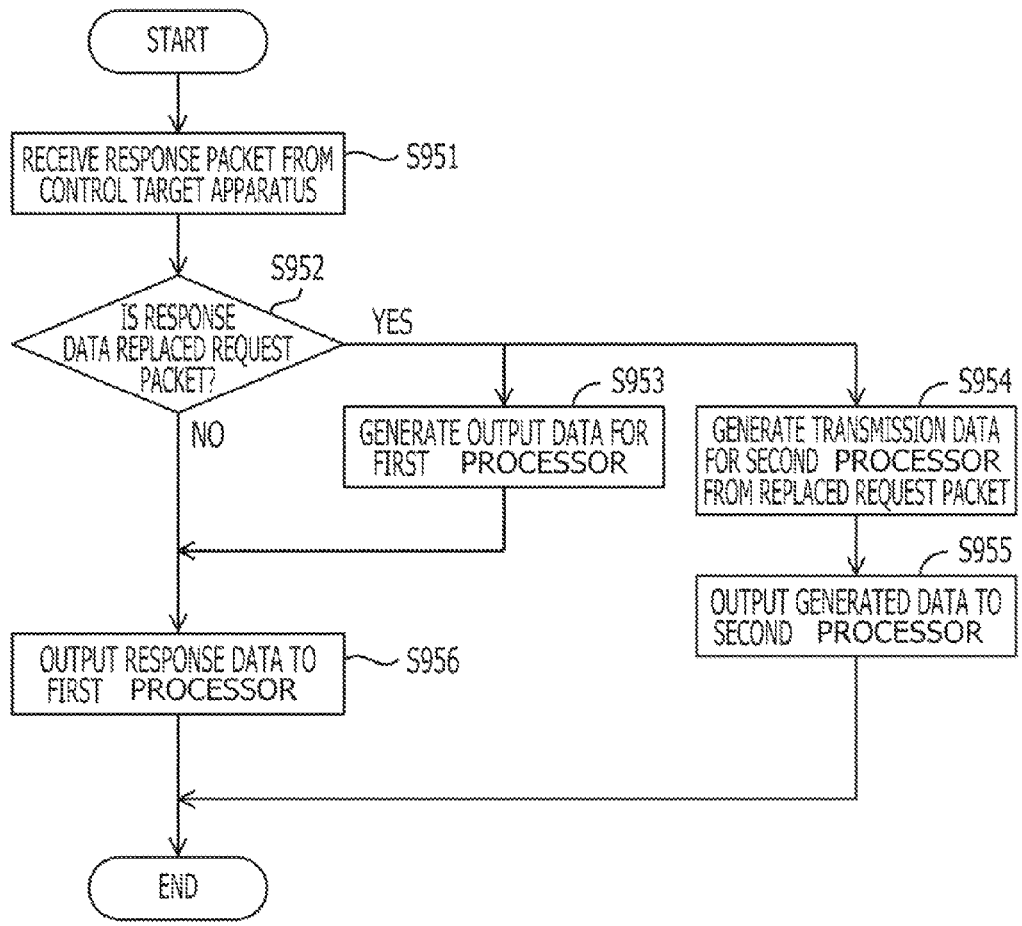
FIG. 13 illustrates a flowchart illustrating an example of a process for outputting data from the switch to the first processor or the second processor.

FIG. 13 is a flowchart illustrating an example of a process for outputting data from the switch 300 to the first processor 100 or the second processor 200. First, the switch 300 receives a response packet from the control target apparatus 400 (S951). The response packet may be a response packet output in response to a read request packet, a write request packet, a control read request packet, a control write request packet, a replaced read request packet, or a replaced write request packet.

The switch 300 then judges whether or not the received response data is a replaced request packet (S952). If the received data is a replaced request packet (Y in S902), the switch 300 uses the address or the payload of the replaced request packet to generate output data for the second processor 200 (S954). If the received data is a replaced request packet (Y in S902), the switch 300 also changes the tag of the replaced request packet to the tag for the first processor 100 and calculates the CRC again, in order to generate output data for the first processor 100 (S953).

After step S954, the switch 300 outputs the output data for the second processor 200 to the second processor 200 (S955). After step S953 or if the received data is not a replaced request packet (N in S902), the switch 300 outputs the output data for the first processor 100 to the first processor 100 (S956).

Figure 14:
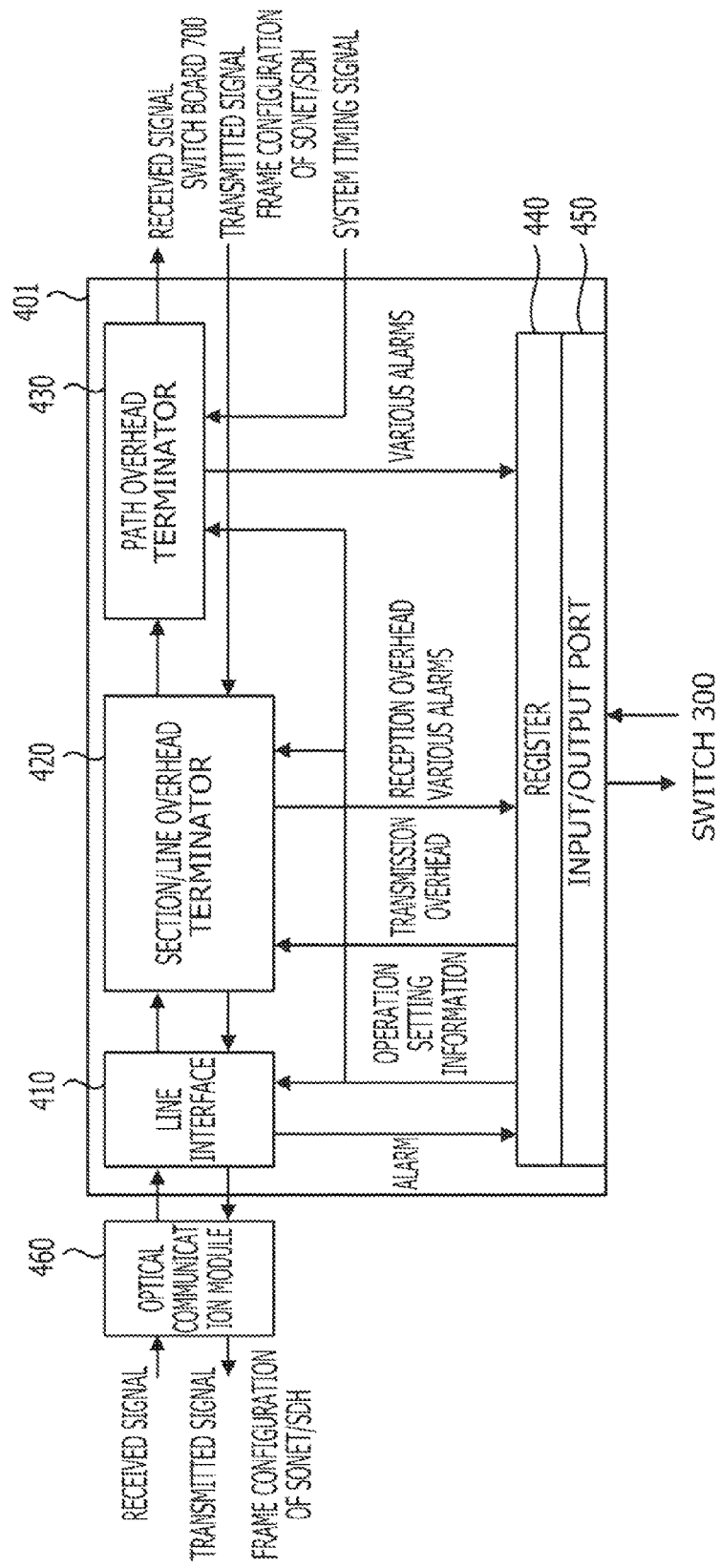
FIG. 14 illustrates a diagram illustrating an example of a termination apparatus.

FIG. 14 is a diagram illustrating an example of a termination apparatus. The termination apparatus 401 corresponds to the termination apparatus 401a illustrated in FIG. 11. The termination apparatus 401 has a line interface 410, a section/line overhead terminator 420, a path overhead terminator 430, a register 440, an input/output port 450, and an optical communication module 460. The optical communication module 460 receives an optical signal through an optical line, as well as converting the optical signal to an electric signal.

The termination apparatus 401 divides a multiplexed signal as an electric signal that has been converted by the optical communication module 460 for each channel and performs the termination process. The termination apparatus 401 then outputs the signal that has been subjected to the termination process to the switch board 700. The input/output port 450 operates, for example, in accordance with PCI Express.

The line interface 410 performs a frame synchronous detection on the received signal, which has been converted into an electric signal, on the basis of framing bytes (A1 and A2) within the received signal, and conducts descrambling. The line interface 410 then outputs the received signal to the section/line overhead terminator 420. In addition, the line interface 410 notifies the register 440 of the results of the frame synchronous detection (LOF and OOF).

The signal transmitted from the line interface 410 scrambles a signal input from the section/line overhead terminator 420, and is output to the optical communication module 460.

The section/line overhead terminator 420 receives the signal from the line interface 410. The section/line overhead terminator 420 terminates "J0, B1, and D1 to D3 bytes", which is a section overhead (SOH), and "K1, K2, D4 to D12, and M1 bytes", which is a line overhead (LOH), within the received signal. The section/line overhead terminator 420 outputs the results of the termination to the register 440. The section/line overhead terminator 420 detects an L-alarm indication signal (AIS) and Remote Defect Indication (RDI) on the basis of the received K2 byte, and notifies the register 440 of the results. In addition, the section/line overhead terminator 420 detects a bit error through a parity check using B1 and B2 bytes, and notifies the register 440 of the results.

If a failure in the frame synchronous detection (LOF and OOF) or an L-AIS has been detected, an RDI code is inserted into K2 byte within the transmitted signal input from the switch board 700. In addition, if a bit error has been detected, the results of the detection are inserted into M1 byte within the transmitted signal, and any of the apparatuses 800a to 800f is notified of the detection of the error. Furthermore, information such as a section switching request (K1 and K2 bytes) and data link information (D1 to D12) that is written to the register 440 by the switch 300 is inserted into a section/line overhead within the transmitted signal, and any of the apparatuses 800a to 800f is notified of the information.

The path overhead terminator 430 detects the position of J1 byte on the basis of STS (AU) pointer bytes (H1, H2, and H3) within the received signal input from the section/line overhead terminator 420. The path overhead terminator 430 then terminates "J1, B2, C2, and G1", which is a path overhead.

In order to output the received signal to the switch board 700 at system timing within an apparatus, the termination apparatus 401 replaces a pointer and outputs the received signal to the switch board 700. In addition, the line interface 410, the section/line overhead terminator 420, and the path overhead terminator 430 perform detection of alarms such as a pointer abnormality, a Path-AIS, and a parity error due to B3 byte and notifies the register 440 of the results of the detection of alarms.

The register 440 stores various alarms and OH byte and notifies the switch 300 of the corresponding data when there is a read command from the switch 300 through the input/output port 450. The register 440 also stores operation setting information from the switch 300 and notifies each processor of the operation setting information. The operation setting information includes, for example, a rate change between OC12 and OC48 or the operation switching between Synchronous Optical Networking (SONET) and Synchronous Digital Hierarchy (SDH).

Figure 15:
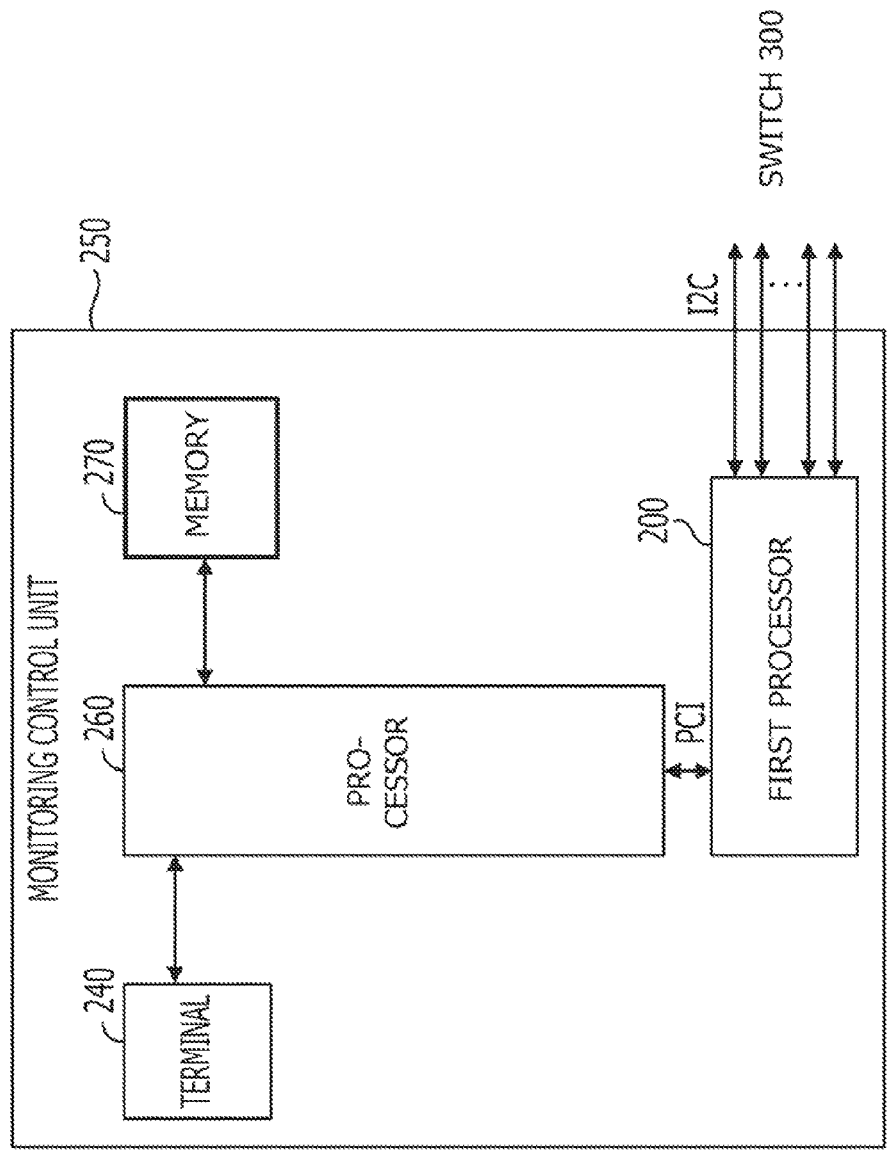
FIG. 15 illustrates a diagram illustrating an example of a monitoring controller.

FIG. 15 is a diagram illustrating an example of a monitoring controller. The monitoring controller 250 has a processor 260, a memory 270, a terminal 240, and the second processor 200. The processor 260 executes a program stored in the memory 270 to realize various functions. For example, upon receiving a command from the terminal 240, the processor 260 issues an instruction of operation setting to the optical transmission apparatus 500k, the termination apparatus 401, or the switch board 700. In addition, the processor 260 collects alarms detected by the optical transmission apparatus 500k and outputs the alarms to the terminal 240. The second processor 200 performs, for example, an SOH/LOH byte process for the switch board 700. The second processor 200 may be, for example, an FPGA. The second processor 200 is connected to the processor 260. The second processor 200 sets the switching operation and receives or outputs data link information from or to the apparatuses 800a to 800f. In addition, the second processor 200 transmits or receives OH byte to or from the transmission apparatus 500k and collects transmission path alarms through I²C.

The monitoring controller 250 collects, through I²C, alarms that have been detected when, for example, an operation for switching to a redundant system that is interlocked with the apparatuses 800a to 800f is set or a failure is detected in a transmission path of a certain optical transmission apparatus. For example, in order to switch to a redundant system, first, the monitoring controller 250 checks whether or not a transmission path alarm of an optical transmission apparatus to which the operation is to be switched has been collected. If an alarm of the optical transmission apparatus has not been collected, that is, the operation is normal, the second processor 200 notifies the switch board 700 of a switching command through I²C to perform a switching operation. In addition, the second processor 200 sets a switching command code in K1 and K2 bytes and transmits the switching command code to the optical transmission apparatus through I²C. The optical transmission apparatus inserts K1 and K2 bytes into a transmission frame and transmits the transmission frame to any of the apparatuses 800a to 800f. The apparatus that has received the transmission frame performs the SOH/LOH byte process and, for example, confirms three consecutive matching of K1 and K2 bytes. In the case of a switching command code, in order to execute system switching, a switching command is output to the switch board 700 through I²C. Thus, the monitoring controller 250 executes switching in which an apparatus and another apparatus are interlocked with each other in a short period of time.

Figure 16:
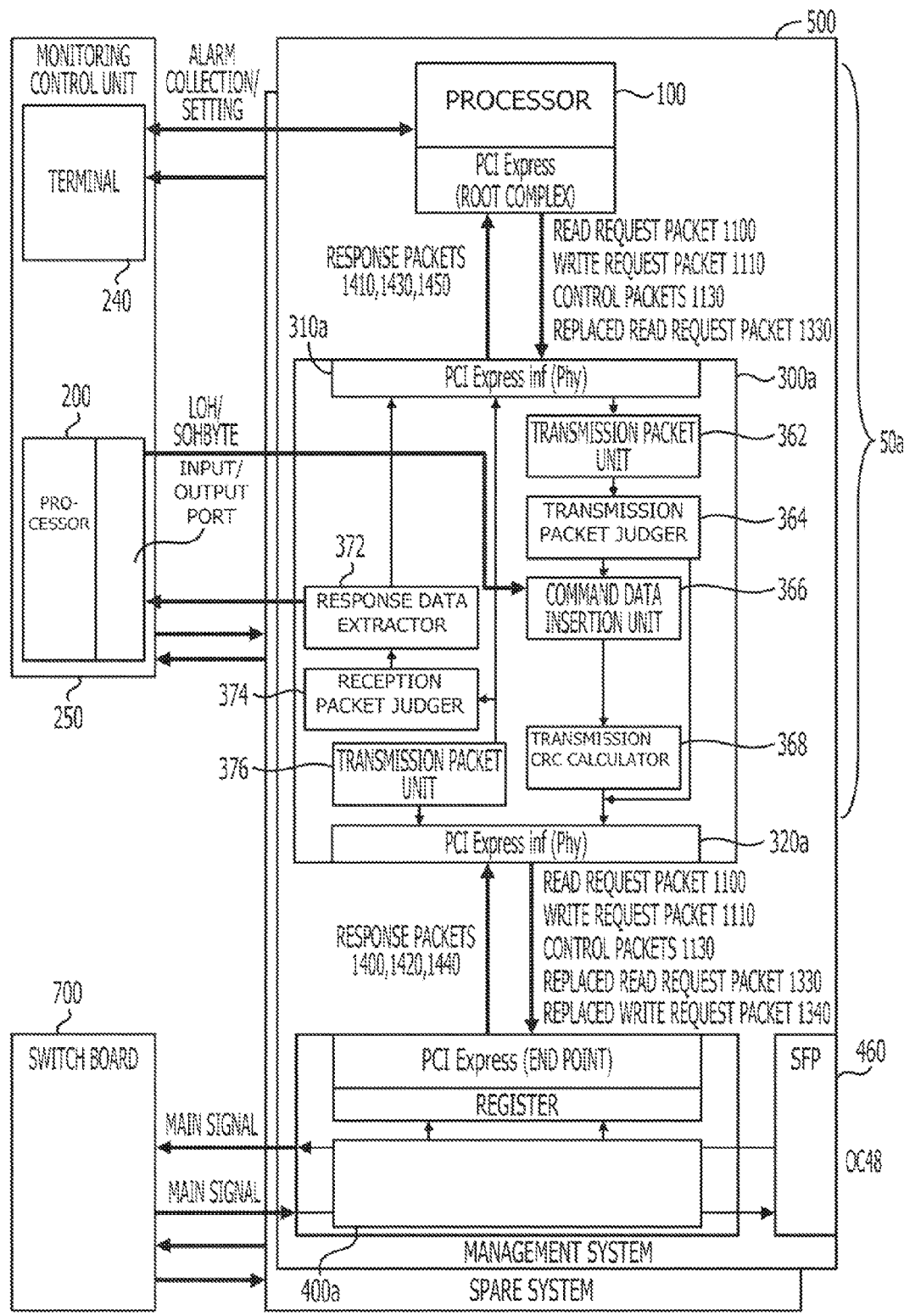
FIG. 16 illustrates a diagram illustrating a second example of the optical transmission apparatus.

FIG. 16 is a diagram illustrating a second example of an optical transmission apparatus. The second example of a transmission apparatus 500m is different from the optical transmission apparatus 500j in that the first processor 100 outputs a read request packet RRP corresponding to a replaced read request packet RRRP in place of the second processor 200 and does not output a control read request packet. The read request packet RRP is a read request to the address of the control target apparatus 400, to which normally the second processor 200 makes a read request. Thus, since the first processor 100 outputs the read request packet RRP, a process for changing a response packet output in response to a replaced write request packet to a control read request packet is not performed. Therefore, a process for calculating the CRC of the control packet that has been subjected to the change can be omitted, and therefore the reception CRC calculator 370 used in the first example of an optical transmission apparatus is not necessary. Thus, the number of component blocks of the switch 300 is reduced, thereby making it possible to reduce the switch 300 in size compared to the switch 300 included in the first example of an optical transmission apparatus. For example, an FPGA and an ASIC included in the second example of an optical transmission apparatus can be reduced in size compared to an FPGA and an ASIC included in the first example of an optical transmission apparatus.

Figure 17:
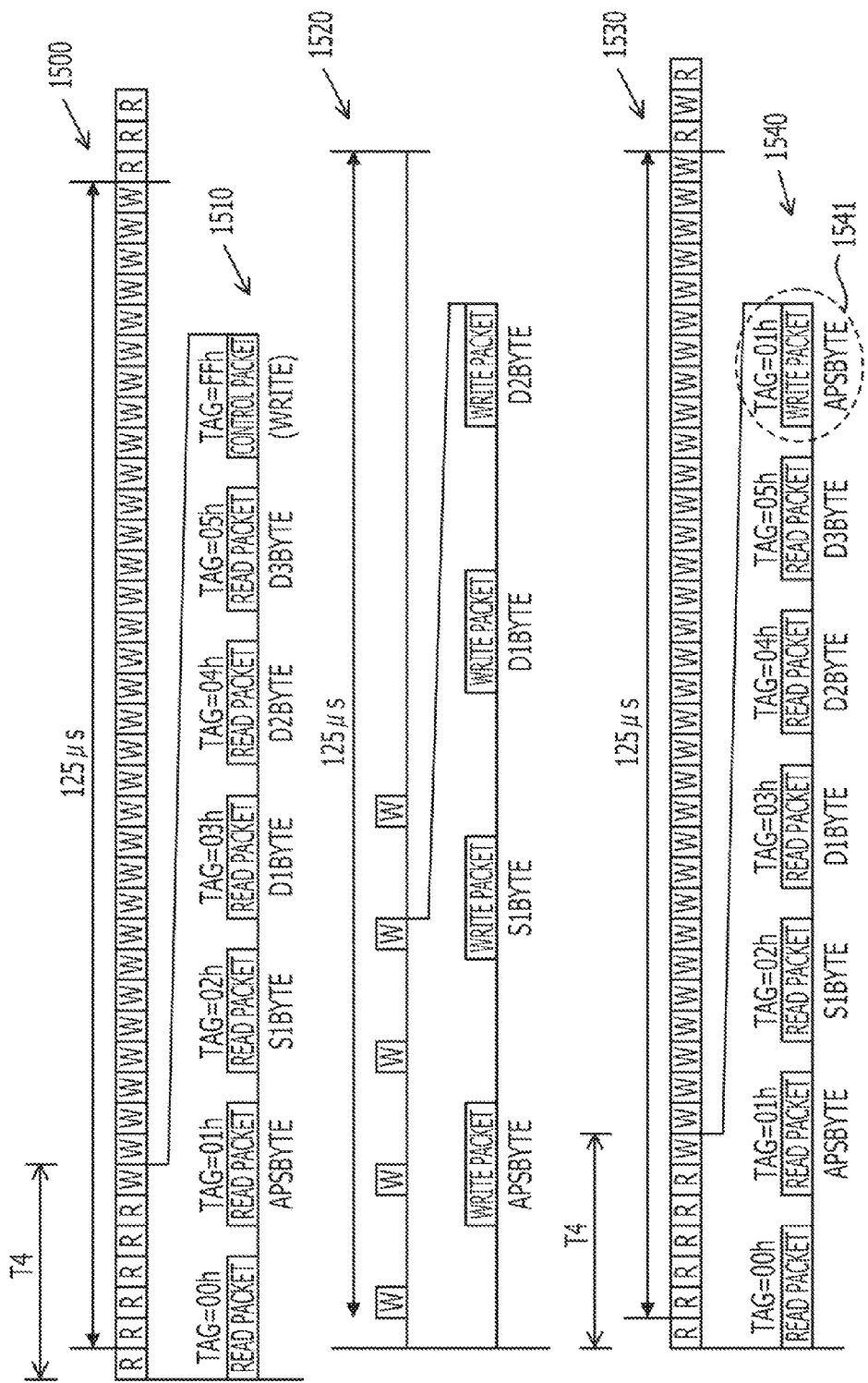
FIG. 17 illustrates an example of timing charts illustrating the timing at which the first processor transmits control packets.

FIG. 17 is an example of time charts illustrating the timing at which the first processor 100 transmits control packets. A time chart 1500 is a time chart in which the first processor 100 outputs "read" (R) and "write" (W) to the termination apparatus 401. "R" illustrated in the time chart 1500 indicates a read packet, and "W" illustrated in the time chart 1500 indicates a write packet or a control write request packet. As can be seen, the first processor 100 does not output a read request packet having a tag "0xFF".

A time chart 1510 is a time chart obtained by magnifying a period T4 in the time chart 1500. In the period T4, 6 read packets and a control write request packet are output.

A time chart 1520 is a time chart in which the second processor 200 outputs "write" (W) to the termination apparatus 401. As illustrated, the second processor 200 does not output read data.

A time chart 1530 is a time chart of packets in which the first processor 100 outputs "read" (R) and "write" (W) to the control target apparatus 400. A time chart 1540 is a time chart obtained by magnifying a period T4 in the time chart 1530. As indicated in a replaced write packet 1541 in the time chart 1540, a control write request packet CWRP is output from the switch 300 as a replaced write request packet RWRP that includes write data in the payload.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. A control apparatus comprising:
   a first processor that is operative to perform outputting first data including control data using a first communication method;
   a first input/output interface that receives the first data using the first communication method;
   a second input/output interface that receives and outputs data using the first communication method;
   a third input/output interface that receives and outputs data using a second communication method, in which transmission speed is lower than transmission speed in the first communication method; and a second processor that is operable to perform controlling the second input/output interface in such a way that the second input/output interface outputs third data, which is obtained by replacing the control data included in the first data received by the first input/output interface with second data received by the third input/output interface, to a control target apparatus, controlling the control target apparatus in such a way that the control target apparatus outputs the third data received from the second input/output interface, and controlling the third input/output interface in such a way that the third input/output interface outputs response data in response to the third data received from the control target apparatus, wherein the control data is a tag of a response packet, and the replaced tag is used to indicate whether the third data is a response to a write request packet, a read request packet, a control packet, a replaced read request packet, or a replaced write request packet.

2. The control apparatus according to claim 1, wherein the first processor is operative to further perform generating a read command to be output from a processing apparatus connected to the third input/output interface to the control target apparatus, and wherein the second processor is operative to further perform controlling the third input/output interface in such a way that the third input/output interface outputs content of response data in response to the read command received from the control target apparatus.

3. The control apparatus according to claim 1, wherein the first processor is operative to further perform outputting the first data when the first processor does not output control information for controlling the control target apparatus.

4. The control apparatus according to claim 1, wherein the second processor is operative to further perform controlling the first input/output interface in such a way that the first input/output interface outputs response data to the first processor in response to the first data, and wherein the first processor is operative to further perform monitoring normal operation of the control target apparatus when there is no control data in the received response data output in response to the first data.

5. The control apparatus according to claim 1, wherein the second processor is operative to further perform controlling the first input/output interface in such a way that the first input/output interface outputs response data to the first processor in response to the first data, and wherein the first processor is operative to further perform confirming normal operation of a processing apparatus connected to the third input/output interface when there is no control data in the received response data output in response to the first data.

6. A switch connected to a processing apparatus that outputs first data including control data using a first communication method, the switch comprising:

a first input/output interface that receives the first data using the first communication method;

a second input/output interface that receives and outputs data using the first communication method;

a third input/output interface that receives and outputs data using a second communication method, in which transmission speed is lower than transmission speed in the first communication method; and a processor that is operative to perform controlling the second input/output interface in such a way that the second input/output interface outputs third data, which is obtained by replacing the control data included in the first data received by the first input/output interface with second data received by the third input/output interface, to a control target apparatus, controlling the control target apparatus in such a way that the control target apparatus outputs the third data received from the second input/output interface, and controlling the third input/output interface in such a way that the third input/output interface outputs response data in response to the third data received from the control target apparatus, wherein the control data is a tag of a response packet, and the replaced tag is used to indicate whether the third data is a response to a write request packet, a read request packet, a control packet, a replaced read request packet, or a replaced write request packet.

7. The switch according to claim 6, wherein the processing apparatus generates a read command to be output from another processing apparatus connected to the third input/output interface to the control target apparatus, and wherein the processor is operative to further perform controlling the third input/output interface in such a way that the third input/output interface outputs content of response data in response to the read command received from the control target apparatus.

8. The switch according to claim 6, wherein the processing apparatus outputs the first data when the processing apparatus does not output control information for controlling the control target apparatus.

9. The switch according to claim 6, wherein the processor controls the first input/output interface in such a way that the first input/output interface outputs response data to the processing apparatus in response to the first data, and wherein the processing apparatus monitors normal operation of the control target apparatus when there is no control data in the received response data output in response to the first data.

10. The switch according to claim 6, wherein the processor controls the first input/output interface in such a way that the first input/output interface outputs response data to the processing apparatus in response to the first data, and wherein the processing apparatus confirms normal operation of a processing apparatus connected to the third input/output interface when there is no control data in the received response data output in response to the first data.

11. An optical transmission apparatus comprising:

a termination apparatus that converts an optical signal into an electric signal and that performs a termination process on the electric signal;

a processing apparatus that outputs first data including control data using a first communication method;

a first input/output interface that receives the first data using the first communication method;

a second input/output interface that receives and outputs data using the first communication method;

a third input/output interface that receives and outputs data using a second communication method, in which transmission speed is lower than transmission speed in the first communication method; and a processor that is operative to perform controlling the second input/output interface in such a way that the second input/output interface outputs third data, which is obtained by replacing the control data included in the first data received by the first input/output interface with second data received by the third input/output interface, to a termination apparatus, controlling the termination apparatus in such a way that the termination apparatus outputs the third data received from the second input/output interface, and controlling the third input/output interface in such a way that the third input/output interface outputs response data in response to the third data received from the termination apparatus, wherein the control data is a tag of a response packet, and the replaced tag is used to indicate whether the third data is a response to a write request packet, a read request packet, a control packet, a replaced read request packet, or a replaced write request packet.

12. A control method for controlling a switch connected to a processing apparatus that outputs first data including control data using a first communication method, the control method comprising:

receiving, using a first input/output interface of the switch, the first data using the first communication method, the first data includes control data;

receiving, using a third input/output interface of the switch, data using a second communication method, in which transmission speed is lower than transmission speed in the first communication method;

controlling, using a processor of the switch, a second input/output interface of the switch in such a way that the second input/output interface outputs third data, which is obtained by replacing the control data included in the first data received by the first input/output interface with second data received by the third input/output interface, to a control target apparatus;

controlling, using a processor of the control target apparatus in such a way that the control target apparatus outputs the third data received from the second input/output interface, and outputting, using the third input/output interface, data in response to the third data received from the control target apparatus, wherein the control data is a tag of a response packet, and the replaced tag is used to indicate whether the third data is a response to a write request packet, a read request packet, a control packet, a replaced read request packet, or a replaced write request packet.

* * * * *